United States Patent [19]

Horvath

[11] Patent Number: 4,744,150
[45] Date of Patent: May 17, 1988

[54] CONTAINER FOR TAPE RULER WITH MANUAL PENCIL SHARPENER

[76] Inventor: Dwayne A. Horvath, 202 Front St., Dunnelen, N.J. 08812

[21] Appl. No.: 942,255

[22] Filed: Dec. 16, 1986

[51] Int. Cl.⁴ .............................................. G10B 3/10
[52] U.S. Cl. ...................................... 33/138; 30/452
[58] Field of Search ................ 30/457, 453, 459, 451, 30/452; 33/138

[56] References Cited

U.S. PATENT DOCUMENTS 503,794  8/1893  Holben ................................. 30/452

FOREIGN PATENT DOCUMENTS 725934  1/1966  Canada ............................ 33/138 R

*Primary Examiner*—William D. Martin, Jr.
*Attorney, Agent, or Firm*—Daniel H. Bobis

[57] ABSTRACT

A combined tape measuring device and pencil sharpener disposed in a single container having tape measuring means retractably mounted therein, a slot to permit movement of said tape measuring means in and out of said container, and shaped and sized openings communicating with the exterior of said container in a region remote from said slot to accomodate the shaped and sized pencil sharpener which is removably mounted in said container in spaced relation to said measuring means, said pencil sharpener having, a sharpening blade communicating with the exterior of said container, an opening to introduce the unsharpened end of a pencil into an oblique conical bore which is operatively associated with said sharpening blade in order to facilitate in contouring the writing end of a pencil, and a passage communicating with the exterior of said container and said sharpening blade so that the pencil shavings can escape from said sharpener upon rotation of said pencil.

6 Claims, 1 Drawing Sheet 4,744,150

CONTAINER FOR TAPE RULER WITH MANUAL PENCIL SHARPENER

BACKGROUND OF THE INVENTION

This invention relates generally to implements for carpenters, mechanics and the like, and more particularly to a combined tape measuring device and pencil sharpener.

In the past, pencil sharpeners have been combined with hammers, pencil clips, and even a scale, as shown in U.S. Pat. Nos. 3,294,067; 3,980,114; and 503,794, respectively. However, one prior art combinations possess many shortcomings and have limited applications. For example, the pencil sharpeners shown in U.S. Pat. Nos. 3,294,067 and 3,980,114 provide reservoirs for pencil shavings which are susceptible to clogging thus impeding the sharpening process. Further, and more pertinent, U.S. Pat. No. 503,794 provides a pencil sharpener in combination with a rigid scale which has limited measuring capabilities and must have a rather large cross-section in order to accommodate the pencil sharpener.

Thus, the prior art is entirely deficient in providing an implement that would enable carpenters, mechanics and the like to make measurements of any kind and, without leaving the work area, sharpen the writing end of the pencil or other writing implement being used to mark the measurement made or make calculations.

Accordingly, the present invention provides a tape measuring device which is readily usable in most measuring applications, in combination with a pencil sharpener which is strategically positioned within the housing of the tape measuring device to permit the pencil shaving to escape therefrom.

SUMMARY OF THE INVENTION

The present invention covers a combination tape measuring device and pencil sharpener having, a housing assembly defining a chamber, tape measuring means retractably mounted in said chamber, and pencil sharpening means operatively disposed within said housing assembly, said pencil sharpening means including an oblique conical bore having a large sized opening at one end and a small opening at the end opposite therefrom (tapered end) and a longitudinal passage exposing the length of the bore, and a sharpening blade longitudinally disposed to cover a portion of said longitudinal passage said pencil sharpening means being positioned in communication with the exterior of said housing assembly so that pencil shavings can escape from the pencil sharpening means.

Accordingly, it is the object of the present invention to provide a combined tape measuring device and pencil sharpener.

It is another object of the present invention to provide a combined tape measuring device and pencil sharpener where the tape measure is readily usable in a variety of measuring applications.

It is another object of the present invention to provide a combined tape measuring device and pencil sharpener where the pencil sharpening means is disposed to communicate with the exterior of the tape measuring device so as to enable all pencil shavings to escape from the pencil sharpening means and the housing asembly.

It is a further object of the present invention to provide a combined tape measuring device and pencil sharpener which is simply structured and inexpensive to manufacture.

These and other objects will become apparent, as will a better understanding of the concepts underlying the present invention, by reference to the description which follows taken in conjunction with the accompanying drawings.

DETAILED DESCRIPTION OF THE INVENTION

Figure 1:
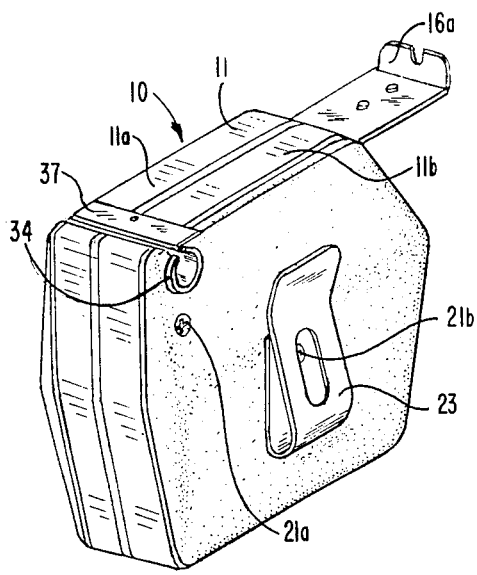
FIG. 1 is an inverted perspective view showing the bottom of the combined tape measuring device and pencil sharpener in accordance with the present invention.

Referring to the drawings, FIGS. 1-6 illustrate the preferred embodiment of the combined tape measuring device and pencil sharpener generally designated as 10 in accordance with the present invention.

The combined tape measuring device and pencil sharpener 10 includes a housing assembly 11 which is made from metal, plastic or any other suitable material. The housing assembly 11 consists of two shell members 11a and 11b which define the housing chamber 12 shown in FIG. 3.

Figure 2:
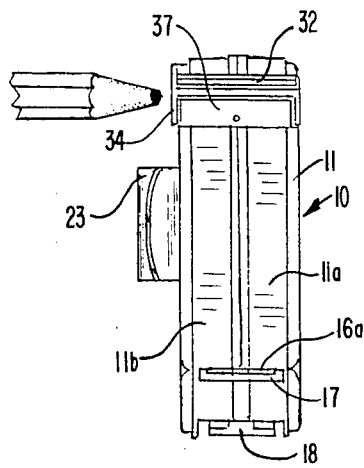
FIG. 2 is a bottom plan view of the combined tape measuring device and pencil sharpener shown in FIG. 1.
Figure 3:
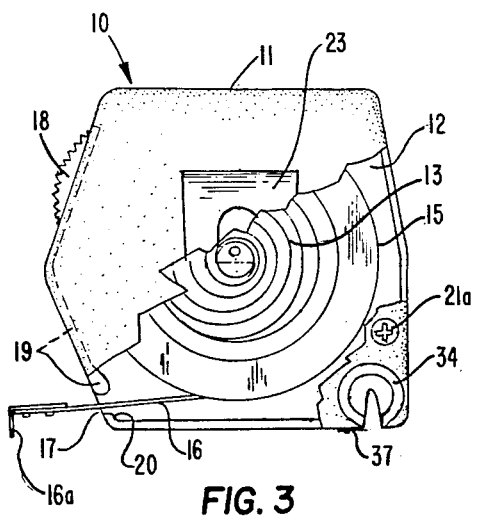
FIG. 3 is a partially broken away side view showing the tape measuring means wound about the spring-returnable spool disposed in the chamber of the combined tape measuring device and pencil sharpener shown in FIG. 1.

Further reference to FIG. 3 shows that a spiral coiled spring 13 of rectangular cross section is operatively connected at one end to a spindle 14 which protrudes transversely from shell member 11a, and operatively connected at its other end to spool 15. Windably disposed about spool 15 is a flat flexible tape measuring means 16, preferably made from metal, which is disposed for movement in and out of slot 17 provided at a point substantially flush with the bottom side of the housing assembly 11. A generally L-shaped hook member 16a is fixed by any suitable means to the end of tape measuring means 16 to prevent the tape measuring means 16 from completely retracting into the housing chamber 12 where it would be inaccessible, and also to hook on the end of the specific object being measured, as shown in FIG. 2.

One skilled in the art will readily recognize that the spiral coil spring 13 serves to automatically rewind the tape measuring means 16 about spool 15 after L-shaped hook member 16a is released from the object being measured. However, if it is desired to leave the tape measuring means 16 in the extended position, thumb-actuator 18 can be moved downwardly to force tape measuring means 16 against the bottom surface 20 of the housing assembly 11 by means of lock member 19.

Figure 6:
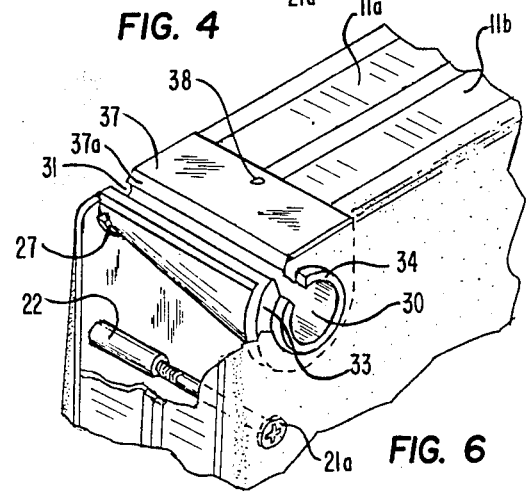
FIG. 6 is an exploded perspective view of the pencil sharpening means as mounted in the housing of the combined tape measuring device and pencil sharpener shown in FIG. 1.

The shell members 11a and 11b are connected by means of screw members 21a and 21b which are transversely disposed through shell member 11b to engage spindle 22 and central spindle 14 respectively, which protrude transversely from the inner surface of shell member 11a, as shown in FIGS. 3 and 6.

A clip member 23, as most clearly shown in FIG. 1, is fastened to the outside of shell member 11b by means of screw member 21b so that the combined tape measuring device and pencil sharpener can be hooked on a belt, work apron or the like.

Figure 4:
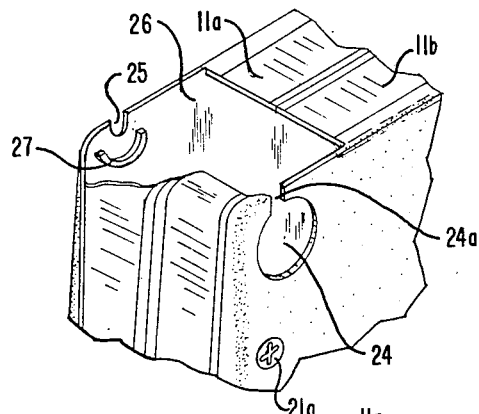
FIG. 4 is an exploded broken-away perspective view of the housing assembly of the combined tape measuring device and pencil sharpener shown in FIG. 1 without the pencil sharpener mounted therein.

A circular opening 24, as shown in FIG. 4, for association with pencil sharpener 28 is provided on the back side of shell member 11b in communication as at 24a with the bottom side of the housing assembly and at a point remote from slot 17. FIG. 4 further shows a relatively small U-shaped opening 25 which is formed in shell member 11a transversely opposite to circular opening 24. A longitudinal opening 26 having dimensions to accomodate those of pencil sharpener 28, the structure of which is discussed below in detail, traverses the bottom side of the housing assembly 11 thus connecting U-shaped opening 25 with circular opening 24.

FIG. 4 is partially broken away to show that fixed to the interior surface of shell member 11a and directly below opening 25 is a generally U-shaped bracket 27 for supporting the tapered end of the pencil sharpener 28.

Figure 5:
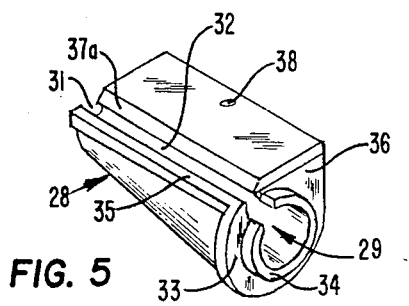
FIG. 5 is an exploded perspective view of the pencil sharpener of the combined tape measuring device and pencil sharpener shown in FIG. 1.

FIG. 5 shows an exploded perspective view of the pencil sharpener generally designated as 28 which is preferably formed from a piece of suitably hard plastic. A generally tapered shaft provides an oblique conical bore 29 extending therethrough with a sized circular opening 30 at one end to receive a pencil or other implement to be sharpened and a relatively small opening 31 at the end opposite therefrom, or the tapered end, and a longitudinal passage 32 exposing the oblique conical bore 29 and connecting large opening 30 with small opening 31. The length of pencil sharpener 28 is sized to accommodate the width of housing assembly 11 and openings 30 and 31 are disposed so as to matingly align with openings 24 and 25 of the housing assembly 11, respectively, when the pencil sharpener 28 is assembled within the same.

An annular collar 33 is formed inwardly of sized circular opening 30 thus leaving a peripheral lip 34 about sized circular opening 30. Peripheral lip 34 is diametrically sized to fit snugly within circular opening 24 of shell member 11b for purposes discussed below.

Longitudinal shoulders 35 and 36 are integrally formed with the generally tapered shaft on either side of longitudinal passage 32. Sharpening blade 37 is riveted, by means of rivet 38, to the upper surface of longitudinal shoulder 36 so that sharpening edge 37a extends partially into longitudinal passage 32. Thus, the upper surface of longitudinal shoulder 35 and the upper surface of sharpening blade 37 partially fills longitudinal opening 26 of housing assembly 11 and are flush with the bottom surface thereof when assembled within housing assembly 11, as is apparent from the FIGS.

In assembling the combined tape measuring device and pencil sharpener 10, spiral coiled spring 13, spool 15, tape measuring means 16, thumb-actuator 18, and lock member 19 are secured within shell member 11a as one skilled in the art of making conventional tape measuring devices will readily recognize.

Pencil sharpener 28 is then placed in position as shown in FIG. 6 with its tapered end resting in U-shaped bracket 27 which is fixed to the inside wall of shell member 11a. Shell member 11b is then placed onto shell member 11a so that peripheral lip 34 enters opening 24 and annular collar 33 engages the inside surface of shell member 11b. Screw members 21a and 21b are then inserted through shell member 11b and into spindle 22 and central spindle 14, respectively. As screw members 21a and 21b are turned clockwise to matingly engage the female threads provided within spindle 22 and central spindle 14, shell members 11a and 11b will be secured to one another to form housing assembly 11.

It should be noted that spindle 22 and screw member 21a are located directly adjacent to pencil sharpener 28, thus compressively securing the same within housing assembly 11 by means of shell member 11b acting against annular collar 33 of pencil sharpener 28 and shell member 11a acting against the tapered end of the pencil sharpener 28.

In assembled condition, peripheral lip 34 is in relatively snug engagement with the inner periphery of opening 24 so as to prevent the sharpener 28 from moving out of alignment with said opening 24. U-shaped bracket 27 serves a similar purpose in preventing the tapered end of pencil sharpener 28 from falling into housing chamber 12, as is clearly shown in FIG. 6.

Thus, a combined tape measuring device and pencil sharpener which is readily usable in numerous measuring applications and for convenient sharpening of pencils or the like as well as providing other desirable features has been described.

While the foregoing description and Figures illustrate one preferred embodiment of the combined tape measuring device and pencil sharpener in accordance with the present invention, it should be appreciated that certain modifications may be made in the structure and operation of the disclosed embodiment without departing from the spirit and scope of the invention as defined by the claims which are set forth below.

What is claim is:

1. In combination tape measuring device readily usable in a variety of measuring applications and a pencil sharpener for sharpening the writing end of a pencil including,
    a. a housing assembly having interior and exterior surfaces and defining a chamber;
    b. elongated tape measuring means retractably mounted in said housing assembly for movement in and out of said chamber;
    c. bracket means in the housing assembly in predetermined spaced relation to the tape measuring means; and
    d. a pencil sharpening unit operatively connectible to said bracket means for mounting the pencil sharpening unit in communication with the exterior of said housing assembly to enable pencil shavings to escape from said pencil sharpening unit.

2. In combination, a tape measuring device and pencil sharpener as claimed in claim 1 wherein, said pencil sharpening means includes a generally tapered shaft having a conical bore extending end to end therethrough and a sized circular opening to permit the introduction of the writing end of a pencil into said conical bore.

3. In combination, a tape measuring device and pencil sharpener as claimed in claim 1 wherein, said pencil sharpening unit includes a generally tapered shaft having an oblique conical bore extending end to end therethrough, a sized opening to permit the introduction of the writing end of a pencil into said oblique conical bore, a longitudinal passage exposing the length of said oblique conical bore and communicating with the exterior of said housing assembly, and a sharpening blade connected to said generally tapered shaft and operativley associated with said longitudinal passage and said oblique conical bore, said sharpening blade being disposed for operative communication with the writing end of a pencil when said pencil is rotated within said conical bore.

4. In combination, a tape measuring device and pencil sharpener as claimed in claim 3 wherein,
   a. an annular collar is formed on said pencil sharpener unit inwardly of said sized opening to define a peripheral lip,
   b. said housing assembly having an opening therein disposed in alignment with the bracket means,
   c. said annular collar and said peripheral lip being sized and shaped for operative engagement with the opening in said housing assembly when said pencil sharpener unit is mounted in the bracket means.

5. In combination, a tape measuring device and pencil sharpener as claimed in claim 3 wherein, said sharpening blade partially extends into said longintudinal passage for the entire length thereof.

6. In a tape measuring device having, a housing assembly comprising, a first shell member and a second shell member each having mating and connectible side members to define a chamber in assembled relation, and an elongated tape measuring means retractably mounted in the housing for movement in and out of said chamber, the combination with said first shell member and second shell member of;
   a. a pencil sharpener unit,
   b. means for installing the pencil sharpener unit in the chamber in said housing in predetermined spaced relation to the elongated tape measuring means,
   c. said means including, first bracket means on said first shell member, and an opening in the second shell member spaced from and in alignment with said first bracket means,
   d. said pencil sharpener unit having, second bracket means about one end thereof, and
   e. said pencil sharpener unit sized in assembled position to enable said second bracket means to engage the opening in the second shell member and to fit and be held in the first bracket means on said first shell member to enable operative use of the pencil sharpener unit without interference with the elongated tape measuring means.

* * * * *